(12) United States Patent
Kuo

(10) Patent No.: US 8,206,013 B2
(45) Date of Patent: Jun. 26, 2012

(54) LIGHT-GUIDING MODULE

(75) Inventor: Heng-Sheng Kuo, Taipei (TW)

(73) Assignee: San Ho Enterprise Co., Ltd., Taipei Hsien (TW)

( * ) Notice: Subject to any disclaimer, the term of this patent is extended or adjusted under 35 U.S.C. 154(b) by 185 days.

(21) Appl. No.: 12/755,420

(22) Filed: Apr. 7, 2010

(65) Prior Publication Data

US 2011/0249448 A1 Oct. 13, 2011

(51) Int. Cl.
*F21V 3/00* (2006.01)

(52) U.S. Cl. ................. 362/311.01; 362/600; 362/601

(58) Field of Classification Search .................. 362/600, 362/602, 606, 551, 552, 217.01, 311.01
See application file for complete search history.

(56) References Cited

U.S. PATENT DOCUMENTS 5,647,655 A * 7/1997 Kashima et al. ............. 362/606

FOREIGN PATENT DOCUMENTS

JP 2002279817 * 9/2002

* cited by examiner

*Primary Examiner* — Ali Alavi
(74) *Attorney, Agent, or Firm* — Kile Goekjian Reed & McManus PLLC

(57) ABSTRACT

A light-guiding module includes a casing, a light-guiding body, a light source, and a light-abating element. The casing has an accommodating space and a light-emerging surface. The light-guiding body is received in the accommodating space of the casing and has a light-entering surface and a light-emerging surface. The light-emerging surface is located to correspond to the light-emerging surface of the casing. The light source is located to correspond to the light-entering surface of the light-guiding body. The light-abating element is located to correspond to the light-emerging surface of the light-guiding body, and the light-abating element may be located close to the light source. The light-abating element may be provided at a position which the light-guiding body is close to the light source, thereby making the light emerging from the light-guiding body to become more uniform and thus overcoming the problem that the brightness of light is uneven.

12 Claims, 9 Drawing Sheets

LIGHT-GUIDING MODULE

BACKGROUND OF THE INVENTION

1. Field of the Invention

The present invention relates to a light-guiding module, and in particular to a light-guiding module provided in an optical touch screen.

2. Description of Related Art

Recently, with the development of a touch screen, a user can input commands by using a touch pen or even his/her finger to directly tip the touch screen, thereby replacing the traditional input operation of keys or buttons. Thus, the touch screen has become popular recently. When the user tips an icon on the touch screen, a touch feedback system on the screen is activated based on preset programs so as to generate a vivid picture on the screen.

There are several categories of touch screens, such as resistance type, capacitance type, acoustic-wave type, optical type and etc. The optical touch screen utilizes a principle of receiving or intercepting light. A touch intercepts the light, and a light receiver can determine the position at which the light is intercepted, thereby generating a predetermined action. As shown in FIG. 1, the optical touch screen includes a light-guiding module 11 and a light receiver 12 which are arranged on a liquid crystal display 13. The light emitted by light-emitting diodes 111 in the light-guiding module 11 is reflected by light-guiding strips 112 to form a touch space. When a finger or object is located in the touch space to intercept the light, the light receiver 12 can determine the position of the finger or the object with respect to the touch space.

However, when the light emitted by the light-emitting diode 111 enters the light-guiding strips 112 to form a light L, the brightness of the light L is higher if the distance between the light L and the light-emitting diode 111 is lower. Further, the brightness of the light L is lower if the distance between the light L and the light-emitting diode 111 is larger. Light-guiding microstructures (not shown) are provided in the light-guiding strips 112 to refract the light. Thus, the brightness of the light near the light-guiding microstructures is larger. As a result, the light throughout the touch space is not uniform, so that the optical signals received by the light receiver 1 are not uniform either, which may cause an erroneous determination easily. To solve this problem, a common solution is to adjust the parameters of the light receiver 12, which undesirably causes the inconvenience in production. If the adjustment is improper, an erroneous determination is also generated, which results in unqualified products.

Thus, it is an important issue for designers and manufacturers in this art to improve the structure of the light-guiding module to generate uniform light.

In order to overcome the problems of the above-mentioned socket, the present inventor proposes a novel and reasonable structure based on his delicate researches and expert experiences.

SUMMARY OF THE INVENTION

An objective of the present invention is to provide a light-guiding module, which is capable of generating more uniform light and overcoming the problem of uneven brightness of the light.

In order to achieve the above-mentioned objective, the present invention provides a light-guiding module, which includes a casing, a light-guiding body, a light source, and a light-abating element.

The casing is formed with an accommodating space and a light-emerging surface. The light-guiding body is received in the accommodating space of the casing and has a light-entering surface and a light-emerging surface adjacent to the light-entering surface. The light-emerging surface is located to correspond to the light-emerging surface of the casing.

The light source is located to correspond to the light-entering surface of the light-guiding body. The light-abating element is located to correspond to the light-emerging surface of the light-guiding body.

Preferably, the light-abating element may be a light-pervious piece having a light-equalizing effect or a light-impervious piece. The shape, size, and transmittance of the light-abating element can be adjusted based on the magnitude of the light source.

The present invention has advantageous features as follows. The light-abating element is located to correspond to the light-emerging surface of the light-guiding body so as to shield the position at which the brightness of the light is large, thereby abating the brightness of the light at this position. In this way, the light throughout the light-guiding module can be made more uniform, and the problem that the brightness of light is uneven can be overcome. Therefore, the light-guiding module of the present invention can be used in an optical touch screen more efficiently.

In order to further understand the characteristics and technical contents of the present invention, a description relating thereto will be made with reference to the accompanying drawings. However, the drawings are illustrative only but not used to limit the present invention.

BRIEF DESCRIPTION OF THE DRAWINGS

FIG. 3A is a cross-sectional view taken along the line 3A-3A in FIG. 3;

DETAILED DESCRIPTION OF THE PREFERRED EMBODIMENTS

Figure 1:
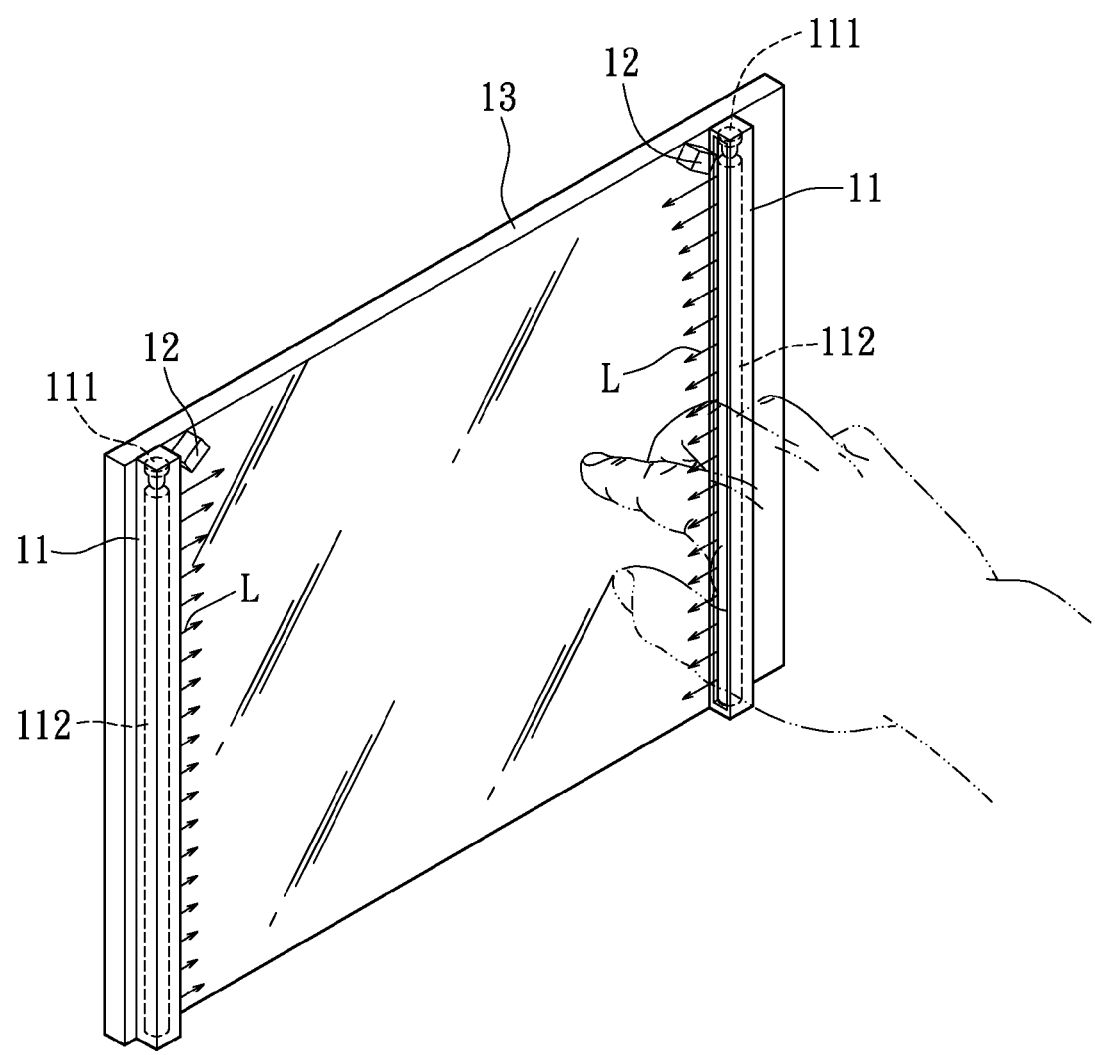
FIG. 1 is a schematic view of a conventional optical touch screen.
Figure 2:
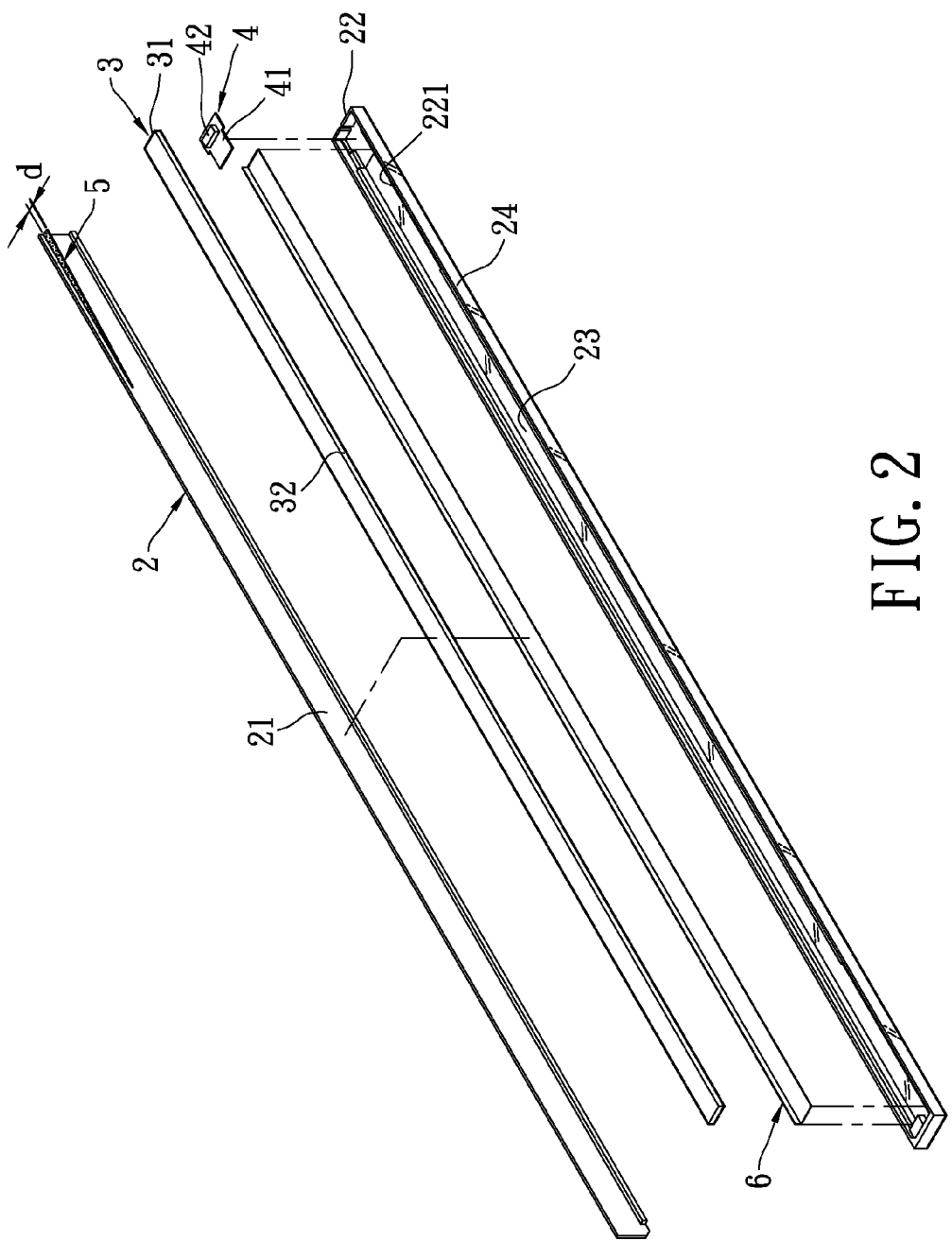
FIG. 2 is an exploded perspective view showing a first embodiment of the present invention.
Figure 3:
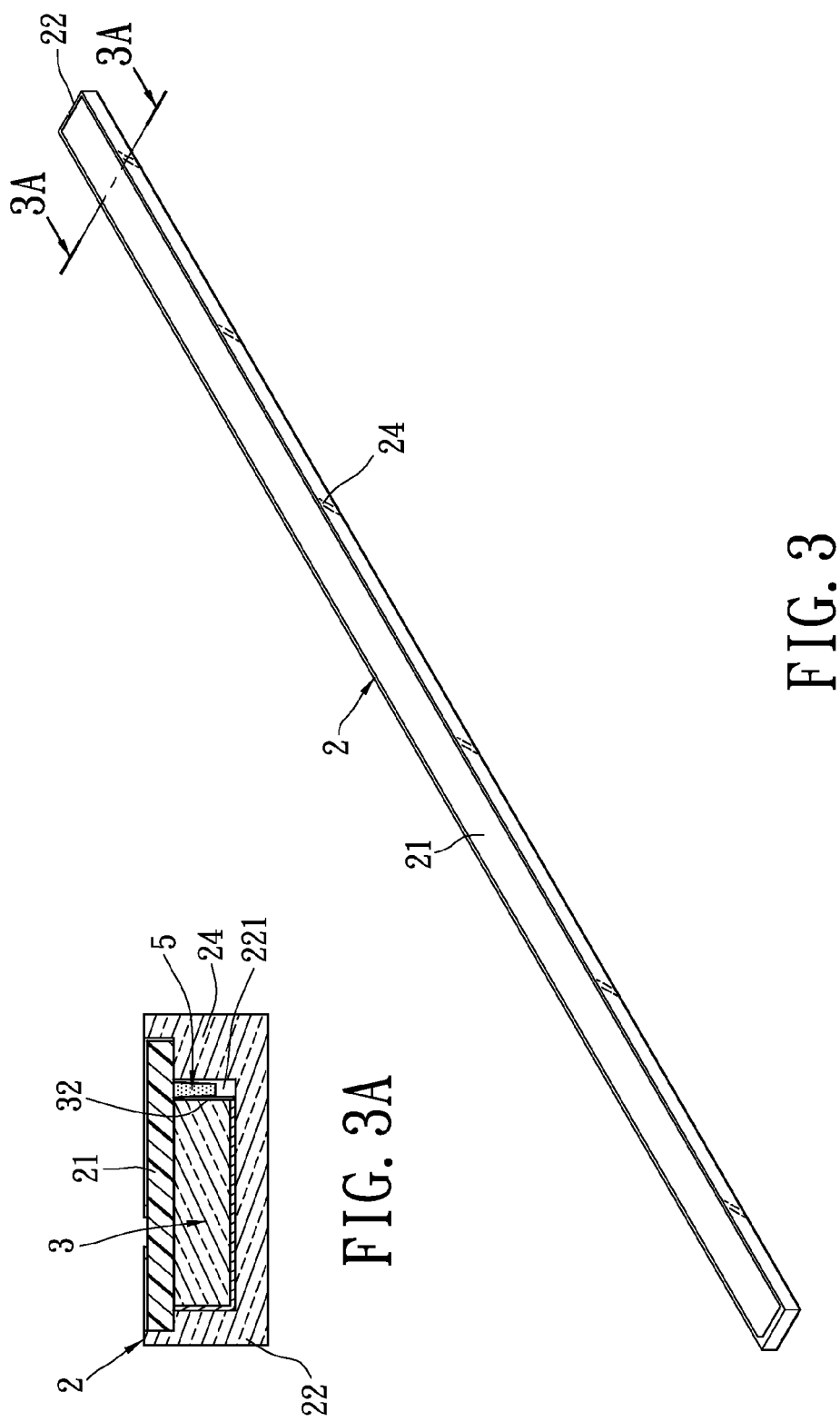
FIG. 3 is an assembled view showing the first embodiment of the present invention.

Please refer to FIGS. 2 and 3. The present invention provides a light-guiding module, which includes a casing 2, a light-guiding body 3, a light source 4, and a light-abating element 5. The present invention further includes a light-reflecting plate 6.

The casing 2 is elongated-shaped, and has a cover 21 and a base 22 combined with each other. The casing 2 has an accommodating space 23 which is defined in the base 22 and a light-emerging surface 24 which is formed on one side of the base 22.

The light-guiding body 3 is also elongated-shaped. The size (width and length) of the light-guiding body 3 is smaller than that of the casing 2. The light-guiding body 3 is made of polycarbonate, acrylic, glass, or other suitable materials. The light-guiding body 3 has a light-entering surface 31 and a light-emerging surface 32 adjacent to the light-entering surface 31.

The light source 4 is constituted of a circuit board 41 and light-emitting diodes 42 provided on the circuit board 41.

In the present embodiment, the light-abating element 5 is a light-pervious piece having a light-equalizing effect. Alternatively, the light-abating element 5 is a translucent element having a foggy surface. The length of the light-abating element 5 may be smaller than that of the light-guiding body 3.

The light-reflecting plate 6 is made by bending a metallic piece, but it is not limited thereto. The light-reflecting plate 6 may be made by suitable materials with a light-reflecting property.

The light-guiding body 3 is received in the accommodating space 23 of the casing 2. The light-emerging surface 32 is located to correspond to the light-emerging surface 24 of the casing 2.

The light source 4 can be received in the accommodating space 23 of the casing 2 and located to correspond to the light-entering surface 31 of the light-guiding body 3. Alternatively, the light source 4 can be disposed outside the casing 2 to correspond to the light-entering surface 31 of the light-guiding body 3. For example, in the present embodiment, the light source 4 is received in the accommodating space 23 of the casing 2. The light source 4 is located in one short side of the casing 2.

The light-abating element 5 is located to correspond to the light-emerging surface 32 of the light-guiding body 3. As shown in FIG. 3A, the light-abating element 5 may be located in the casing 2, but it is not limited thereto. Alternatively, the light-abating element 5 may be located on the light-emerging surface 24 of the casing 2. Further, the light-abating element 5 may be located close to the light source 4.

The light-reflecting plate 6 is located in the casing 2 and on the bottom of the light-guiding body 3, which is opposite to the light-emerging surface 32 for reflecting the light generated by the light source 4.

Figure 8:
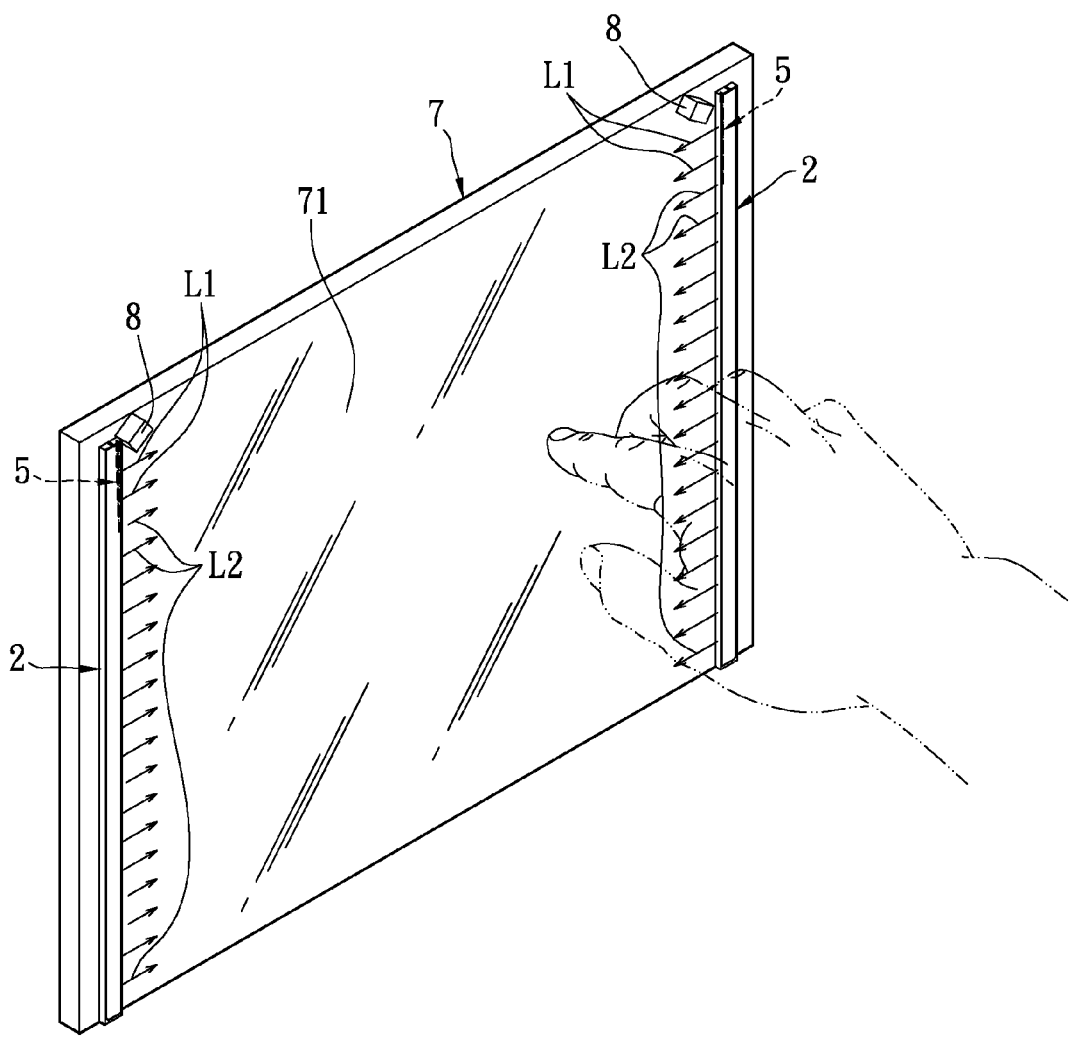
FIG. 8 is a schematic view showing that the present invention is applied to an optical touch screen.

According to the above, after the light-emitting diodes 42 of the light source 4 emit light, the light enters the light-guiding body 3 from the light-entering surface 31, and then the light exits the light-guiding body 3 via the light-emerging surface 32. Finally, the light exits the casing 2 via the light-emerging surface 24. However, in the present embodiment, as shown in FIG. 8, the light-abating element 5 with a light-equalizing effect is close to the light-emerging surface 32 of the light-guiding body 3 and is close to the light source 4, so that the light L1 emerging from the light-emerging surface 32 and closer to the light source 4 with a higher brightness will enter the light-abating element 5, so that the brightness of the light L1 can be abated and then emerges from the light-abating element 5. In this way, the light L2 beyond the light-abating element 5 and emerging from the light-emerging surface 32 of the light-guiding body 3 can be made consistent in brightness with the abated light L1. Thus, the problem that the brightness of light is uneven can be overcame.

Figure 4:
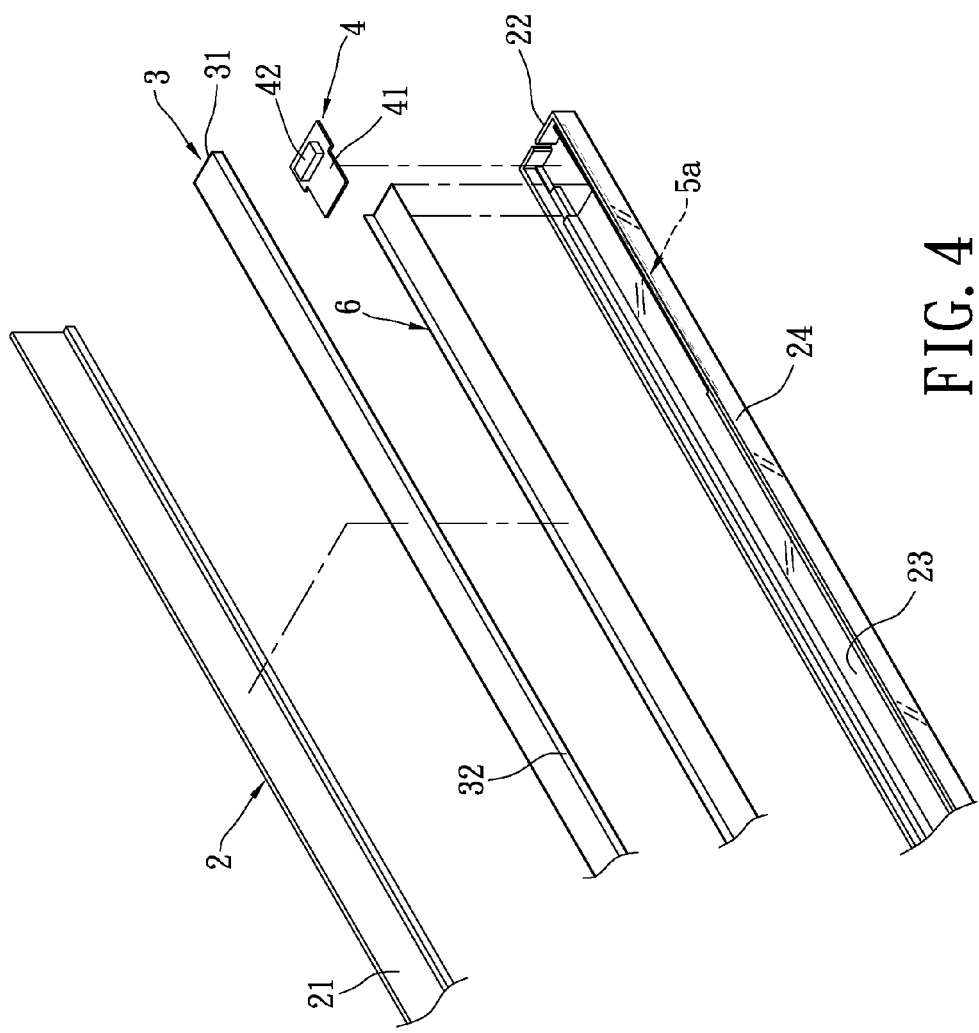
FIG. 4 is an exploded perspective view showing a second embodiment of the present invention.
Figure 5:
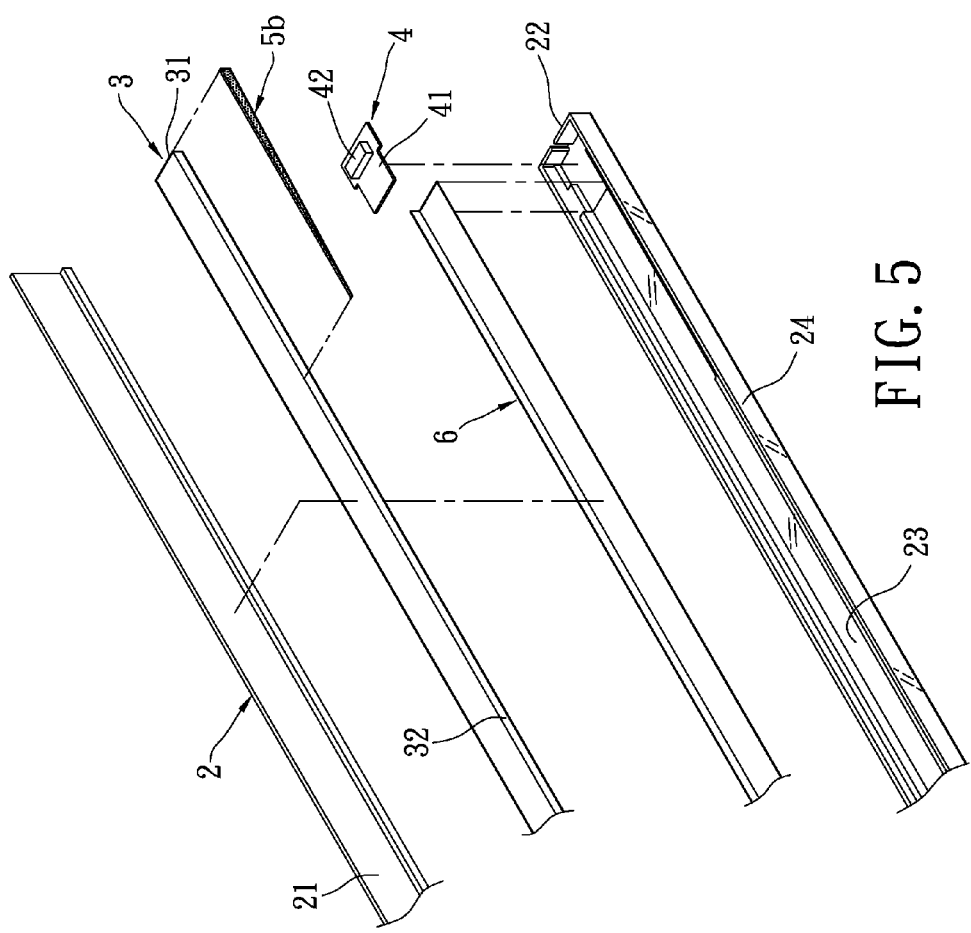
FIG. 5 is an exploded perspective view showing a third embodiment of the present invention.

In a variant of the present invention, the light-abating element 5 is formed by extending from a side portion of the cover 21 of the casing 2, thereby corresponding to the light-emerging surface 32 of the light-guiding body 3. A side portion of the base 22 is formed with an accommodating trough 221 for accommodating the light-abating element 5 (as shown in FIG. 3A). As shown in FIG. 4, the light-abating element 5a is formed by extending from the side portion of the base 22. Alternatively, the light-abating element 5a could be also adhered to the light-emerging surface 24 of the casing 2, but it is not limited thereto. Alternatively, as shown in FIG. 5, the light-abating element 5 may be adhered to the light-emerging surface 32 of the light-guiding body 3.

Further, please refer to FIG. 2 again. The size (such as depth "d") of the light-abating element 5 can be adjusted based on the transmittance of material used and its shape according to the magnitude of the light source 4. That is, if the light-abating element 5 is closer to the light source 4, the depth of the light-abating element 5 is larger. On the contrary, if the light-abating element 5 is further far from the light source 4, the depth of the light-abating element 5 is smaller. Thus, the light-abating element 5 can be designed as a triangular or stepped shape. Through the variation designs of the light-abating element 5, such as depth and transmittance, according to the distance from and the magnitude of the light source 4, the path of light penetrating the light-abating element 5 can be adjusted to a larger or shorter distance, thereby making the light emerging from the light-guiding module more uniform.

Figure 6:
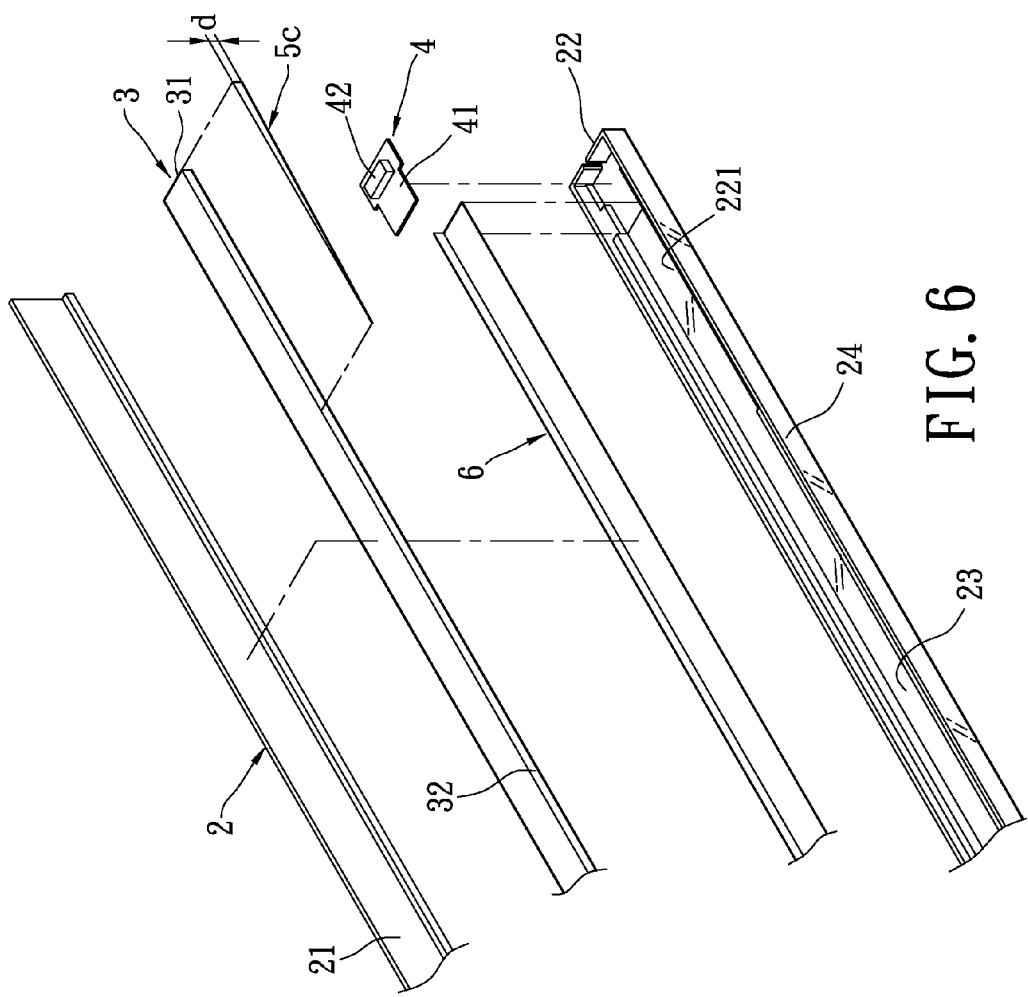
FIG. 6 is an exploded perspective view showing a fourth embodiment of the present invention.
Figure 7:
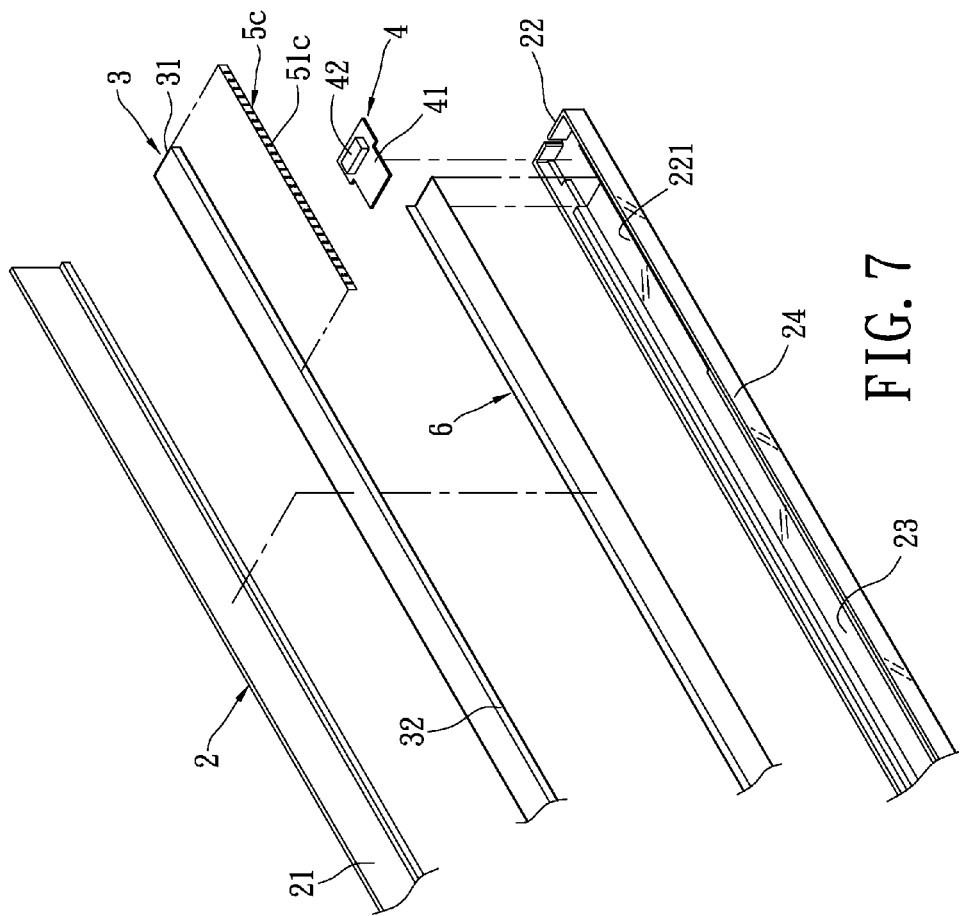
FIG. 7 is an exploded perspective view showing a fifth embodiment of the present invention.

Further, please refer to FIG. 6. In the present embodiment, the light-abating element 5c is a light-impervious piece, such as a metallic piece. The light-abating element 5c may be adhered to the light-emerging surface 32 of the light-guiding body 3 or the light-emerging surface 24 of the casing 2. However, it is not limited thereto. The light-abating element 5c may be printed or coated on the light-emerging surface 32 or the light-emerging surface 24, and then solidified to form a light-impervious layer. The size (such as depth "d") of the light-abating element 5c can be adjusted based on the magnitude of the light source 4, thereby intercepting different amount of light to make the light more uniform. Alternatively, as shown in FIG. 7, the light-abating element 5c may be provided with a plurality of perforations 51c for allowing the light to pass through. A portion of light can pass through the perforations 51c, so that the brightness of the light can be reduced and the light can be made more uniform. The light-abating element 5c can be disposed at suitable positions to correspond to the light-emerging surface 32 of the light-guiding body 3. For example, when the light-guiding body 3 is provided therein with light-guiding microstructures (not shown), the light-abating element 5c may be located to correspond to the light-guiding microstructures or closer to the light source 4.

Please refer to FIGS. 8 and 2. When two light-guiding modules of the present invention are arranged on both sides of a liquid crystal display 7 respectively. The light emitted by the light sources 4 of the two light-guiding modules enters the light-guiding body 3 and is reflected onto the liquid crystal display 7 to form a sensing region 71. The brightness of the light L1 closest to the light source 4 is abated by the light-abating element 5. In comparison with the light L2 away from the light source with a smaller brightness, the light throughput the light-guiding module can be made uniform. Thus, more uniform optical signals can be distributed on the sensing region 71. A light receiver 8 provided in the liquid crystal display 7 can receive the optical signals on the sensing region 71 more smoothly, thereby facilitating the touch control of the touch screen. Thus, the problem that the parameters of the light receiver 8 have to be adjusted can be avoided. Further, the casing 2 is not limited to the specific form shown in the previous embodiment. The casing 2 may be a housing of the display 7, so that the light-guiding body 3 and other members can be mounted in the housing of the display 7 directly.

Figure 9:
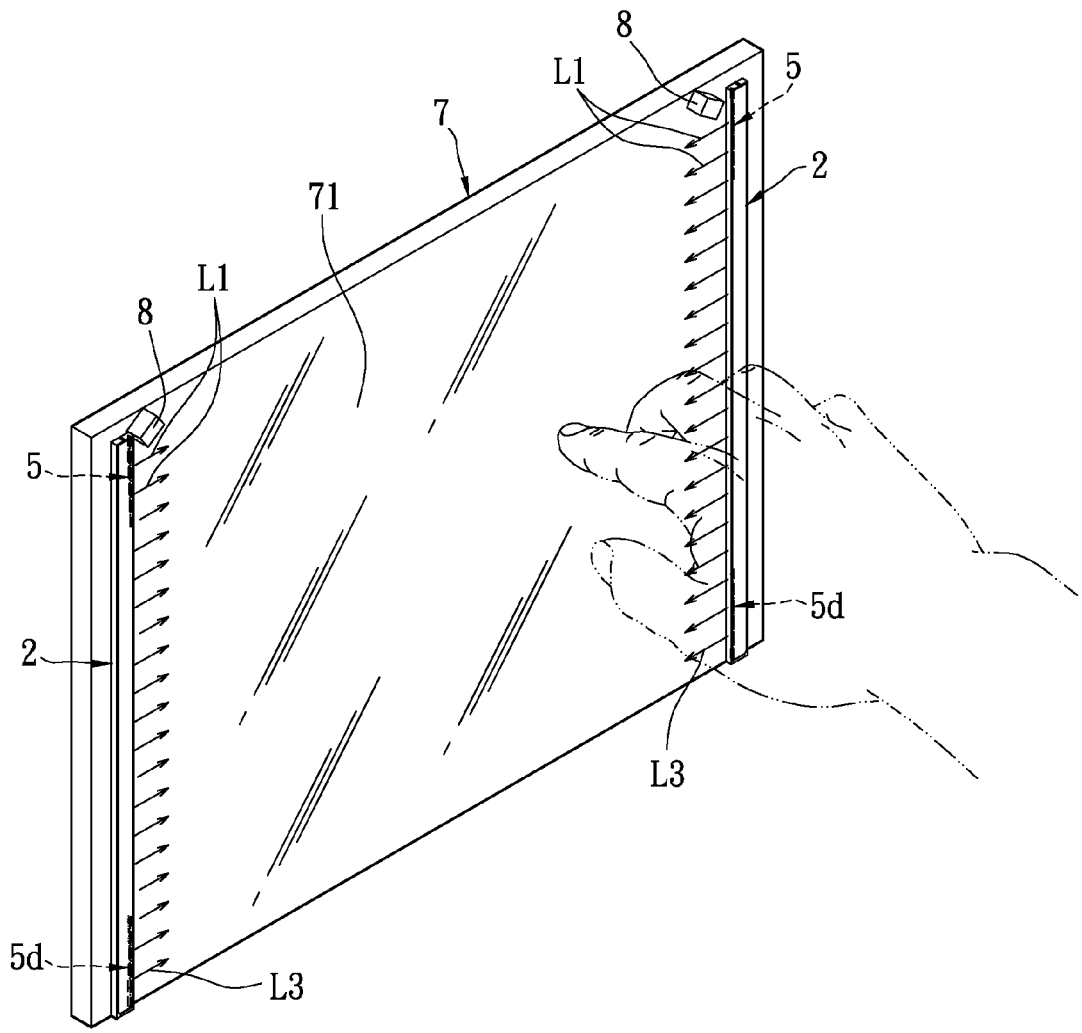
FIG. 9 is a schematic view showing that the sixth embodiment of the present invention is applied to an optical touch screen.

On the other hand, please refer to FIGS. 9 and 2 again. In the present embodiment, the distal end of the light-guiding body 3 is provided with another light-abating element 5d, which is located opposite to the light source 4 and away from the light source 4. The another light-abating element 5d is aligned with the light-emerging surface 32 of the light-guiding body 3 with the same arrangement as that of the previous embodiment.

In the present embodiment, in order to increase the degree of uniformity of optical signals, the light travelling in the light-guiding body 3 can emerge from the distal end of the light-guiding body 3, and then the light is reflected into the light-guiding body 3 again by the casing 2. Thus, the brightness of the light L3 emerging from the light-emerging surface 32 at the distal end of the light-guiding body 3 would be increased. Therefore, the another light-guiding element 5d is configured to make the light L3 at this position to become more uniform, so that the optical signals throughout the sensing region can be made more uniform accordingly for facilitating the touch control of the touch screen.

According to the above description, the light-abating element is located to correspond to the light-emerging surface of the light-guiding body, thereby shielding the position at which the brightness of light is larger. In this way, the brightness of light at this position can be abated to make the light throughout the light-guiding module more uniform. Thus, the problem that the brightness of light is uneven can be overcome, so that the light-guiding module of the present invention can be used in the optical touch screen.

The above-mentioned descriptions represent merely the preferred embodiments of the present invention, without any intention to limit the scope of the present invention thereto. Various equivalent changes, alternations or modifications based on the claims of present invention are all consequently viewed as being embraced by the scope of the present invention.

What is claimed is:

1. A light-guiding module, comprising:
a casing having an accommodating space and a light-emerging surface;
a light-guiding body received in the accommodating space of the casing, the light-guiding body having a light-entering surface and a light-emerging surface adjacent to the light-entering surface, the light-emerging surface being located to correspond to the light-emerging surface of the casing;
a light source located to correspond to the light-entering surface of the light-guiding body; and
a light-abating element located to correspond to the light-emerging surface of the light-guiding body, wherein the light-abating element is a light-pervious piece having a light-equalizing effect.

2. The light-guiding module according to claim 1, wherein the casing has a cover and a base combined with each other, the light-abating element is formed by extending from one side of the cover or extending from one side of the base of the casing.

3. The light-guiding module according to claim 1, wherein the light-abating element is adhered to the light-emerging surface of the light-guiding body or the light-emerging surface of the casing.

4. The light-guiding module according to claim 1, wherein the light-abating element is located close to the light source, a distal end of the light-guiding body opposite to the light source has another light-abating element, the another light-abating element is located to correspond to the light-emerging surface of the light-guiding body.

5. The light-guiding module according to claim 1, wherein the interior of the light-guiding body has light-guiding microstructures, the light-abating element is located to correspond to the light-guiding microstructures.

6. A light-guiding module, comprising:
a light-guiding body having a light-entering surface and a light-emerging surface adjacent to the light-entering surface;
a light source located to correspond to the light-entering surface of the light-guiding body; and
a light-abating element located to correspond to the light-emerging surface of the light-guiding body, wherein the light-abating element is a light-pervious piece having a light-equalizing effect.

7. The light-guiding module according to claim 6, wherein the light-abating element is adhered to the light-emerging surface of the light-guiding body or solidified on the light-emerging surface.

8. A light-guiding module, comprising:
a casing having an accommodating space and a light-emerging surface;
a light-guiding body received in the accommodating space of the casing, the light-guiding body having a light-entering surface and a light-emerging surface adjacent to the light-entering surface, the light-emerging surface being located to correspond to the light-emerging surface of the casing;
a light source located to correspond to the light-entering surface of the light-guiding body; and
a light-abating element located to correspond to the light-emerging surface of the light-guiding body, wherein the light-abating element is a light-impervious piece.

9. The light-guiding module according to claim 8, wherein the light-abating element is located close to the light source, a distal end of the light-guiding body opposite to the light source has another light-abating element, the another light-abating element is located to correspond to the light-emerging surface of the light-guiding body.

10. The light-guiding module according to claim 8, wherein the interior of the light-guiding body has light-guiding microstructures, the light-abating element is located to correspond to the light-guiding microstructures.

11. The light-guiding module according to claim 8, wherein the light-abating element is adhered to the light-emerging surface of the light-guiding body or the light-emerging surface of the casing.

12. The light-guiding module according to claim 8, wherein the light-abating element is solidified on the light-emerging surface of the light-guiding body or the light-emerging surface of the casing.

* * * * *